(12) United States Patent
Klinder et al.

(10) Patent No.: US 8,917,933 B2
(45) Date of Patent: Dec. 23, 2014

(54) MESH COLLISION AVOIDANCE

(75) Inventors: Tobias Klinder, Eindhoven (NL); Robin M. B. Wolz, Eindhoven (NL); Astrid R. Franz, Eindhoven (NL); Cristian Lorenz, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 381 days.

(21) Appl. No.: 12/936,425

(22) PCT Filed: Apr. 2, 2009

(86) PCT No.: PCT/IB2009/051392
§ 371 (c)(1),
(2), (4) Date: Oct. 5, 2010

(87) PCT Pub. No.: WO2009/125319
PCT Pub. Date: Oct. 15, 2009

(65) Prior Publication Data
US 2011/0033104 A1    Feb. 10, 2011

(30) Foreign Application Priority Data

Apr. 7, 2008 (EP) .................................... 08154147

(51) Int. Cl.
*G06K 9/34* (2006.01)
*G06K 9/00* (2006.01)
*G06T 7/00* (2006.01)

(52) U.S. Cl.
CPC ..... *G06T 7/0081* (2013.01); *G06T 2207/30012* (2013.01); *G06T 2207/10116* (2013.01); *G06T 2207/10072* (2013.01)
USPC .......................................... 382/173; 382/154

(58) Field of Classification Search
None
See application file for complete search history.

(56) References Cited

U.S. PATENT DOCUMENTS 5,819,016 A * 10/1998 Watanabe et al. ............. 345/419
7,010,164 B2 * 3/2006 Weese et al. .................. 382/173
(Continued)

FOREIGN PATENT DOCUMENTS

WO    2004010374 A2    1/2004
WO    2006085268 A1    8/2006

OTHER PUBLICATIONS

Xu et al: "Image Segmentation Using Deformable Models"; SPIE Handbook on Medical Imaging, vol. 3, May 2000, pp. 129-174, Retrieved From the Internet on Nov. 9, 2009 At http://iacl.ece.jhu.edu/pubs/p119b.pdf.

(Continued)

*Primary Examiner* — Brian P Werner
*Assistant Examiner* — Feng Niu

(57) ABSTRACT

The invention relates to a system for segmenting an object in image data using model-based image segmentation. The system comprises a feature unit for identifying features in the image data for computing an external energy of a mesh on the basis of a current position of the mesh. The feature unit further comprises a candidate feature unit for selecting a plurality of candidate features in the image data. The feature unit further comprises a position unit for determining a position of each candidate feature of the plurality of the candidate features relative to a region of the image data. The feature unit further comprises a feature function unit for computing a strength of each candidate feature. The feature unit further comprises an evaluation unit for evaluating each candidate feature of the plurality of candidate features and for identifying the feature among the plurality of candidate features based on this evaluation.

9 Claims, 5 Drawing Sheets

(56) References Cited

U.S. PATENT DOCUMENTS

| | | | |
|---|---|---|---|
| 7,292,250 B2 * | 11/2007 | Sepulveda | 345/473 |
| 2002/0184470 A1 * | 12/2002 | Weese et al. | 712/1 |
| 2005/0116938 A1 * | 6/2005 | Ito et al. | 345/173 |
| 2006/0078194 A1 * | 4/2006 | Fradkin et al. | 382/154 |
| 2006/0110037 A1 * | 5/2006 | Kaus et al. | 382/173 |
| 2006/0126922 A1 * | 6/2006 | Von Berg et al. | 382/154 |
| 2006/0159341 A1 * | 7/2006 | Pekar et al. | 382/173 |
| 2006/0182312 A1 * | 8/2006 | Nakai et al. | 382/103 |
| 2007/0167699 A1 * | 7/2007 | Lathuiliere et al. | 600/407 |
| 2008/0143724 A1 * | 6/2008 | Russakoff | 345/441 |
| 2008/0170791 A1 * | 7/2008 | Eskildsen et al. | 382/199 |
| 2008/0205757 A1 * | 8/2008 | Von Berg et al. | 382/173 |
| 2008/0317308 A1 * | 12/2008 | Wu et al. | 382/128 |
| 2009/0136103 A1 * | 5/2009 | Sonka et al. | 382/128 |

OTHER PUBLICATIONS

Weese et al: "Shape Constrained Deformable Models for 3D Medical Image Segmentation"; 117th International Conference on Information Processing in Medical Imaging (IPMI 2001), Lecture Notes in Computer Science (LNCS), vol. 2082, pp. 380-387.

Maciel, A.: "A Biomechanics-Based Articulation Model for Medical Applications"; Ph.D. Thesis, EPFL #3360, 2005, 204 Page Document.

Schramm et al: "Towards Fully Automatic Object Detection and Segmentation"; Medical Imaging 2006: Image Processing, Edited by Joseph M. Reinhardt, Josien P. W. Pluim, Prroceedings of SPIE, vol. 6144, 2006, pp. 614402-1-614402-10.

Kaus et al: "Model-Based Segmentation"; Philips Medical Systems, 2006, 4 Page Article.

Cheung et al: "On Deformabale Models for Visual Pattern Recognition"; Pattern Recognition, vol. 35, 2002, pp. 1507-1526.

Duan et al: "A Subdivision-Based Deformable Model for Surface Reconstruction of Unknown Topology"; Graphical Models, vol. 66, Issue 4, Jul. 2004, pp. 181-202.

* cited by examiner

MESH COLLISION AVOIDANCE

FIELD OF THE INVENTION

The invention relates to image segmentation and more particularly to simultaneous model-based segmentation of multiple objects in image data.

BACKGROUND OF THE INVENTION

Model-based segmentation has numerous applications in interventions and follow-up studies, for instance in radiation therapy planning. Deformable models, described by flexible meshes, for instance triangle meshes or simplex meshes, are adapted to the corresponding image structures. Usually this adaptation is carried out for every object separately by optimizing a weighted sum of two competing energies: an external energy driving the mesh triangles towards features in the image, and an internal energy preserving the form of the model. An implementation of this method is described by J. Weese, M. Kaus, C. Lorenz, S. Lobregt, R. Truyen, V. Pekar in "Shape constrained deformable models for 3D medical Image segmentation", IPMI 2001, 3 pp. 80-387, hereinafter referred to as Ref 1.

A separate adaptation of multiple meshes cannot take spatial relations between several objects into account and hence often results in wrong adaptation results such as for instance intersecting meshes. A first attempt to overcome this problem is described in WO 2004/010374 A2 "Simultaneous segmentation of multiple or composed objects by mesh adaptation". There, additional edges connecting two meshes are introduced into the model. These additional edges are considered as degenerated triangles, and the internal energy is extended for these triangles in order to keep the spatial relationship of the two meshes. However, this procedure is only applicable when the spatial relationship of two objects can be described by pre-positioning the corresponding meshes, since the lengths and positions of the additional edges or triangles are to be preserved. But in a lot of medical applications inner organs are involved which can slide with respect to each other, for instance the organs in the abdominal region, the lung with respect to the rib cage, or two successive vertebrae in the spine. For such organs simultaneous segmentation with the method described in WO 2004/010374 A2 can only avoid mesh intersection, but will nevertheless result in an adaptation with wrong spatial relationships.

SUMMARY OF THE INVENTION

From a more general viewpoint, a region of image data which should not overlap with a mesh adapted to an object in the image data may not be defined by another mesh. For example, when adapting a mesh to an object in image data describing the right hemisphere of the brain, the region to be avoided may be defined by a plane separating the right hemisphere from the left hemisphere. When adapting a mesh to a nodule in the lung, the region to be avoided may be defined by a sphere comprising the nodule.

It would be advantageous to provide means for segmentation of an object, while minimizing the likelihood of or preventing overlap of the adapted model mesh with a region of the image data.

Thus, in an aspect, the invention provides a system for segmenting an object in image data using model-based image segmentation, the system comprising a feature unit for identifying features in the image data for computing an external energy of a mesh on the basis of a current position of the mesh, wherein the feature unit further comprises:

a candidate feature unit for selecting a plurality of candidate features in the image data, for identifying a feature to be included in the features identified in the image data;

a position unit for determining a position of each candidate feature of the plurality of candidate features relative to a region of the image data;

a feature function unit for computing a strength of each candidate feature, wherein the strength of each candidate feature depends on the position of each candidate feature relative to the region; and an evaluation unit for evaluating each candidate feature of the plurality of candidate features and for identifying the feature among the plurality of candidate features based on this evaluation.

Determining whether a selected candidate feature is located inside the region which should be avoided, e.g., inside another mesh adapted to another object in the image data, allows penalizing this candidate feature during the computation of the strength of each feature and thus during the evaluation of the plurality of candidate features. For example, this can be achieved by decreasing the feature strength such that the evaluation unit is more likely to select a candidate feature outside the region. Especially in areas where a lot of wrong image features similar to the correct image features occur, e.g., in the case of the vertebral column, the invention helps identifying the right image feature from the plurality of candidate features. However, if a prominent candidate feature of the image is found inside the region, it may still be taken into account. Advantageously, if the region is defined based on another mesh adapted to another object in the image, finding a prominent feature inside the other mesh may indicate that the other mesh is not well adapted to the other object. Employing an algorithm that iteratively adapts the other mesh to the other object in the image data while penalizing candidate features located inside the mesh, may result in that the other mesh is repelled from the region defined by the adapted mesh, thereby avoiding a collision (i.e. an overlap) of the two meshes.

In an embodiment, the system further comprises:

a pre-positioning unit for pre-positioning the mesh for segmenting the object, thereby initializing the mesh current position;

a transformation unit for computing a transformation which best aligns the mesh in the mesh current position with the pre-positioned mesh;

an adaptation unit for updating the mesh current position by updating current positions of vertices of the mesh to minimize a weighted sum of at least the external energy and the internal energy of the mesh; and a control unit for evaluating a convergence condition dependent at least on the minimized weighted sum or on the updated current position of the mesh, and further for terminating segmenting the object if the condition is satisfied and for continuing segmenting the object if the condition is not satisfied.

Such a system is capable of carrying out a complete segmentation of the object.

In an embodiment of the system, the strength of each candidate feature inside the region is a function of the distance from each candidate feature inside the region to a boundary of the region. For example, the strength of the candidate feature may be a product, wherein a factor of this product depends on the distance from the candidate feature inside the region to a boundary of the region. This provides an easy and yet versatile way of taking into account effects of the position of the candidate feature relative to the region on the strength of the feature.

In an embodiment of the system, the region boundary is defined by a mesh adapted to a second object in the image data. The invention is thus adapted to simultaneous adaptation of multiple objects in the image data.

In an embodiment of the system, the strength of each candidate feature inside the region substantially decreases with the distance from each candidate feature inside the region to the boundary of the region. Candidate features deep inside the region are thus heavier penalized than candidate features close to the boundary of the region.

In an aspect of the invention, the system is used for segmenting a plurality of objects in image data by adapting a mesh to each object of the plurality of objects, wherein, during adaptation of a certain mesh to a certain object of the plurality of objects, the region is defined based on current positions of meshes adapted to objects of the plurality of objects other than said certain mesh. Thus, the system may be arranged to detect and possibly prevent overlap of multiple meshes used for segmenting a plurality of objects in the image data.

In a further aspect of the invention, the system according to the invention is comprised in an image acquisition apparatus.

In a further aspect of the invention, the system according to the invention is comprised in a workstation.

In a further aspect, the invention provides a method of segmenting an object in image data using model-based image segmentation, the method comprising a feature step for identifying features in the image data for computing an external energy of a mesh on the basis of a current position of the mesh, wherein the feature step further comprises:

a candidate feature step for selecting a plurality of candidate features in the image data, for identifying a feature to be included in the features identified in the image data;

a position step for determining a position of each candidate feature of the plurality of the candidate features relative to a region of the image data;

a feature function step for computing a strength of each candidate feature, wherein the strength of each candidate feature depends on the position of each candidate feature relative to the region; and an evaluation step for evaluating each candidate feature of the plurality of candidate features and for identifying the feature among the plurality of candidate features based on this evaluation.

In a further aspect, the invention provides a computer program product to be loaded by a computer arrangement, the computer program comprising instructions for segmenting an object in image data using model-based image segmentation, said instructions further comprising instructions for identifying features in the image data for computing an external energy of a mesh on the basis of a current position of the mesh, the computer arrangement comprising a processing unit and a memory, the computer program product, after being loaded, providing said processing unit with the capability to carry out steps of the method.

It will be appreciated by those skilled in the art that two or more of the above-mentioned embodiments, implementations, and/or aspects of the invention may be combined in any way deemed useful.

Modifications and variations of the image acquisition apparatus, of the workstation, of the method, and/or of the computer program product, which correspond to the described modifications and variations of the system, can be carried out by a person skilled in the art on the basis of the present description.

A person skilled in the art will appreciate that the method may be applied to multidimensional image data, e.g., 2-dimensional (2-D), 3-dimensional (3-D) or 4-dimensional (4-D) images, acquired by various acquisition modalities such as, but not limited to, X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will become apparent from and will be elucidated with respect to the implementations and embodiments described hereinafter and with reference to the accompanying drawings, wherein.

Identical reference numerals are used to denote similar parts throughout the Figures.

DETAILED DESCRIPTION OF EMBODIMENTS

Figure 1:
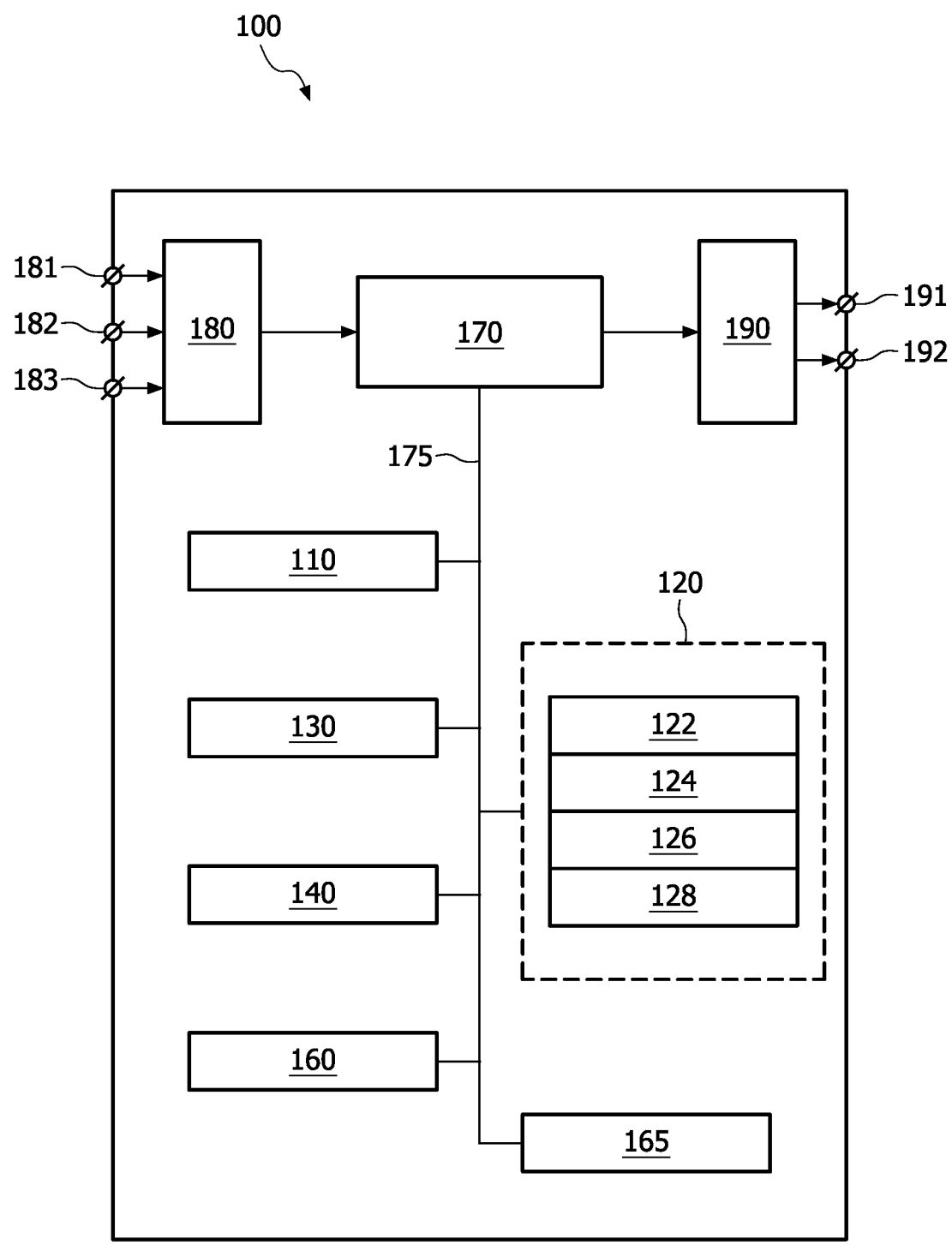
FIG. 1 schematically shows a block diagram of an exemplary embodiment of the system.

FIG. 1 schematically shows a block diagram of an exemplary embodiment of the system 100 for segmenting an object in image data using model-based image segmentation, the system comprising a feature unit 120 for identifying features in the image data for computing an external energy of a mesh on the basis of a current position of the mesh, wherein the feature unit 120 further comprises:

a candidate feature unit 122 for selecting a plurality of candidate features in the image data, for identifying a feature to be included in the features identified in the image data;

a position unit 124 for determining a position of each candidate feature of the plurality of candidate features relative to a region of the image data;

a feature function unit 126 for computing a strength of each candidate feature, wherein the strength of each candidate feature depends on the position of each candidate feature relative to the region; and an evaluation unit 128 for evaluating each candidate feature of the plurality of candidate features and for identifying the feature among the plurality of candidate features based on this evaluation.

The exemplary embodiment of the system 100 further comprises the following units:

a pre-positioning unit 110 for pre-positioning the mesh for segmenting the object, thereby initializing the mesh current position;

a transformation unit 130 for computing a transformation which best aligns the mesh in the mesh current position with the pre-positioned mesh;

an adaptation unit 140 for updating the mesh current position by updating current positions of vertices of the mesh to minimize a weighted sum of at least the external energy and the internal energy of the mesh;

a control unit 160 for evaluating a convergence condition dependent at least on the minimized weighted sum or on the updated current position of the mesh, and further for terminating segmenting the object if the condition is satisfied and for continuing segmenting the object if the condition is not satisfied;

a user interface 165 for communication between a user and the system 100; and a memory unit 170 for storing data.

In an embodiment of the system 100, there are three input connectors 181, 182 and 183 for the incoming data. The first input connector 181 is arranged to receive data coming in from a data storage means such as, but not limited to, a hard disk, a magnetic tape, a flash memory, or an optical disk. The second input connector 182 is arranged to receive data coming in from a user input device such as, but not limited to, a mouse or a touch screen. The third input connector 183 is arranged to receive data coming in from a user input device such as a keyboard. The input connectors 181, 182 and 183 are connected to an input control unit 180.

In an embodiment of the system 100, there are two output connectors 191 and 192 for the outgoing data. The first output connector 191 is arranged to output the data to a data storage means such as a hard disk, a magnetic tape, a flash memory, or an optical disk. The second output connector 192 is arranged to output the data to a display device. The output connectors 191 and 192 receive the respective data via an output control unit 190.

A person skilled in the art will understand that there are many ways to connect input devices to the input connectors 181, 182 and 183 and the output devices to the output connectors 191 and 192 of the system 100. These ways comprise, but are not limited to, a wired and a wireless connection, a digital network such as, but not limited to, a Local Area Network (LAN) and a Wide Area Network (WAN), the Internet, a digital telephone network, and an analog telephone network.

In an embodiment of the system 100, the system 100 comprises a memory unit 170. The system 100 is arranged to receive input data from external devices via any of the input connectors 181, 182, and 183 and to store the received input data in the memory unit 170. Loading the input data into the memory unit 170 allows quick access to relevant data portions by the units of the system 100. The input data may comprise, for example, the image data and model data, the model data comprising mesh data and region data. The memory unit 170 may be implemented by devices such as, but not limited to, a Random Access Memory (RAM) chip, a Read Only Memory (ROM) chip, and/or a hard disk drive and a hard disk. The memory unit 170 may be further arranged to store the output data. The output data may comprise, for example, the current position of the mesh adapted to the object of the plurality of objects. The memory unit 170 may be also arranged to receive data from and/or deliver data to the units of the system 100 comprising the pre-positioning unit 110, the feature unit 120, the transformation unit 130, the adaptation unit 140, the control unit 160, and the user interface 165, via a memory bus 175. The memory unit 170 is further arranged to make the output data available to external devices via any of the output connectors 191 and 192. Storing data from the units of the system 100 in the memory unit 170 may advantageously improve performance of the units of the system 100 as well as the rate of transfer of the output data from the units of the system 100 to external devices.

Alternatively, the system 100 may comprise no memory unit 170 and no memory bus 175. The input data used by the system 100 may be supplied by at least one external device, such as an external memory or a processor, connected to the units of the system 100. Similarly, the output data produced by the system 100 may be supplied to at least one external device, such as an external memory or a processor, connected to the units of the system 100. The units of the system 100 may be arranged to receive the data from each other via internal connections or via a data bus.

In an embodiment of the system 100, the system 100 comprises a user interface 165 for communication between a user and the system 100. The user interface 165 may be arranged to receive a user input for selecting the mesh for adapting to the object in the image data or a user input for defining the region. The user interface may further provide means for displaying a view of the mesh adapted to the object. Optionally, the user interface may receive a user input for selecting a mode of operation of the system such as, e.g., for defining the terms of the external or internal energy, or a pre-positioning method. A person skilled in the art will understand that more functions may be advantageously implemented in the user interface 165 of the system 100.

The pre-positioning unit 110 of the system 100 is arranged for pre-positioning a mesh close to the corresponding object. Pre-positioning may be manual or automatic and may involve detecting the first and second object. A method of detecting objects is described, for example, in "Towards fully automatic object detection and segmentation", Hauke Schramm et al., Proc. SPIE, Volume 6144, 614402, Medical Imaging 2006: Image Processing; Joseph M. Reinhardt, Josien P. Pluim; Eds., pp. 11-20. Pre-positioning the mesh yields an initialized current position of the mesh. The current position of the mesh can be defined by coordinates of each vertex of the mesh in a system of coordinates, e.g. the image data system of coordinates.

Next, the feature unit 120 is arranged for carrying out a search for image features in the image data. The search of each image feature is based on the current position of the mesh. In an embodiment of the system 100, the mesh is a triangular mesh to be adapted to the surface of the object. A feature is identified for each triangle of the mesh. The object surface detection is based on the method described in Section 2.1 of Ref. 1.

First, the candidate feature unit 122 is arranged for selecting n candidate features in the image data. The candidate features are located at points $P_i$, i=1, . . . , n, distributed on the triangle normal, i.e., on an axis perpendicular to the triangle and crossing the barycenter of the triangle. Let $z_i$ denote a coordinate of the corresponding point $P_i$ in a coordinate system defined by the normal and the barycenter.

Second, the position unit 124 is arranged for determining a position of each candidate feature relative to the region of the image data. The position unit 124 may be arranged for computing the distance $d_i$ from each candidate feature located inside the region to the region boundary.

Third, the feature function unit 126 is arranged for computing the strength $F^*_i$ of each candidate feature, wherein the strength $F^*_i$ of the candidate feature depends on the position of each candidate feature relative to the region. In an embodiment, the strength of image features is a product of a factor $c_i$ dependent on the distance $d_i$ and a feature value $F_i$: $F^*_i = c_i F_i$ The factor $c_i$ is set to 1 if the corresponding feature is not inside the region. If the corresponding feature is inside the region, then the following holds: the larger the distance $d_i$—the smaller is the factor $c_i$. The feature value $F_i$ for detecting a surface of the object to be modeled by the mesh may be defined as:

$$F_i = -\vec{n} \cdot \vec{g}_i \frac{g_{max}(g_{max} + g_i)}{(g_{max}^2 + g_i^2)},$$

where $\vec{n}$ is the normal vector of the triangle, $\vec{g}_i$ is the image gradient at the position of the corresponding feature, $g_i = |\vec{g}_i|$, and $g_{max}$ is a gradient threshold.

Fourth, the evaluation unit 128 is arranged for evaluating each candidate feature and for identifying the feature among the plurality of candidate features based on this evaluation. The evaluation unit 128 is arranged for selecting the candidate feature with the greatest strength $F^*_i$. Candidate features which are distant from the barycenter of the corresponding triangle may be additionally penalized. For example, the evaluation unit 128 may be arranged to select the candidate feature which corresponds to the maximum of the sum $F^*_i - \delta |z_i|$, where $\delta$ is a parameter controlling the significance of the distance information with respect to the feature strength.

Next, the transformation unit 130 of the system 100 is arranged for computing a transformation which best aligns the mesh in the mesh current position with the pre-positioned mesh. The transformation is typically constrained to a certain class of transformations, e.g., to similarity transformations or to affine transformations (without reflections). An implementation of computing the transformation which best aligns the mesh in the mesh current position with the corresponding pre-positioned mesh is described in Sections 2.3 and 2.4 of Ref. 1.

The current position of the mesh is updated by the adaptation unit 140 for updating current positions of vertices of the mesh to minimize a weighted sum of at least the external energy and an internal energy of every mesh. The weighted sum of the external and internal energies may be expressed as:

$$E = \alpha E_{ext} + \beta E_{int}$$

In the above equation, $\alpha$ and $\beta$ are weights of the energy contributions. The external energy $E_{ext}$ is computed as described in Section 2.2 of Ref. 1. The internal energy $E_{int}$ is computed as:

$$E_{int} = \sum_{(j,k) \in Edges} (\hat{x}_j - \hat{x}_k - sR(x_j - x_k))^2,$$

where $\hat{x}_j, \hat{x}_k$ denote vectors of vertex coordinates of the corresponding mesh vertices in the pre-positioned mesh and $x_j, x_k$ denote vectors of vertex coordinates of the corresponding mesh vertices of the mesh in the current position, and $R$ and $s$ denote, respectively, a rotation matrix and a scaling factor of a similarity transformation computed by the transformation unit 130.

The control unit 160 of the system 100 is arranged for evaluating a convergence condition dependent at least on the minimized weighted sum or on the updated current position of the mesh, and further for terminating the segmentation if the condition is satisfied and for continuing the segmentation if the condition is not satisfied. An exemplary condition may be that "the number of updates of the current positions of the mesh reached a maximum or the current position has not significantly changed during the last update or the computed weighted sum of energies is less than a predetermined threshold".

The system 100 may be used for segmenting a plurality of objects in image data by adapting a mesh to each object of the plurality of objects, wherein, during adaptation of a certain mesh to a certain object of the plurality of objects, the region is defined based on current positions of meshes adapted to objects of the plurality of objects other than the certain mesh. In an embodiment of the invention, multiple meshes are pre-positioned to delineate a plurality of objects in the image data. Thereby, the current positions of the multiple meshes are initialized. A first mesh of the multiple meshes is then selected for adaptation to a first object of the plurality of objects. The area covered by the remaining meshes defines the region not to be overlapped by the selected mesh. Once the first mesh is adapted to the first object by updating the first mesh current position, a second mesh is selected for adaptation to a second object of the plurality of objects. Again, the area covered by the remaining meshes defines the region not to be overlapped by the second mesh, while the second mesh is adapted to the second object. The process continues until a mesh is adapted to each object of the plurality of objects. Next, a convergence condition is evaluated. If the condition is satisfied, the segmentation is terminated. Otherwise, the segmentation continues with adapting the first mesh to the first object, the second mesh to the second object, and so on. The convergence condition may be that new mesh vertex coordinates do not differ significantly from the previous ones or that a maximum number of multiple mesh adaptations to the plurality of objects has been carried out.

Figure 2:
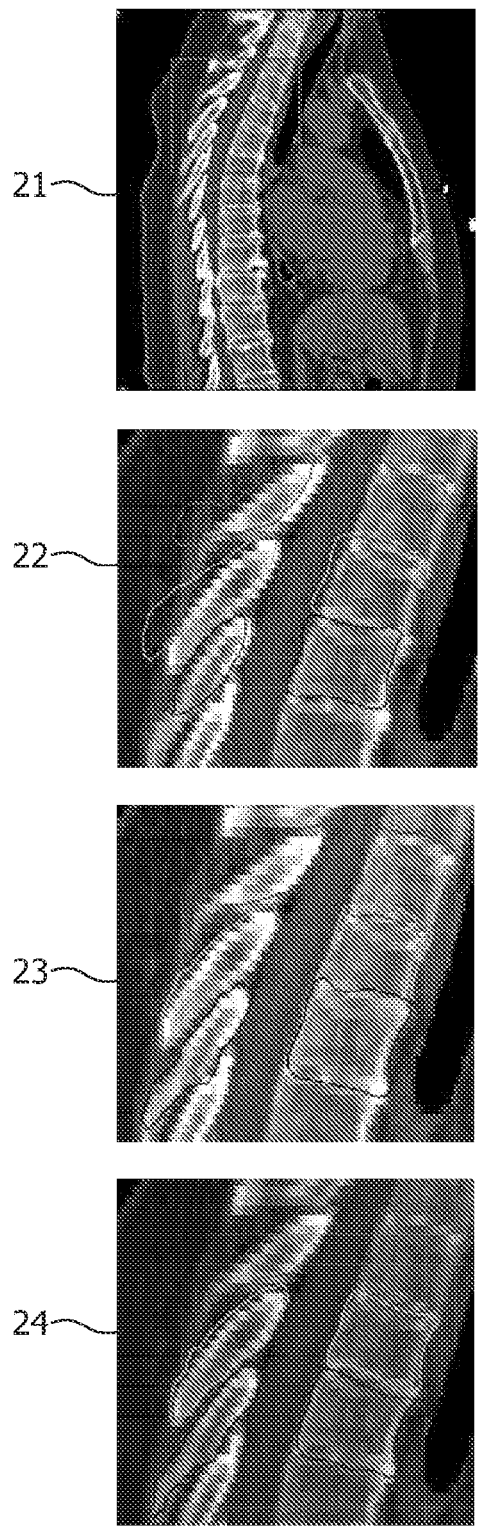
FIG. 2 shows an example of a medical application of the system.

FIG. 2 shows an example of a medical application of the system 100. In the spine image 21, the third, fourth and fifth thoracic vertebrae are to be segmented. A pre-positioning of the three meshes is shown in the second image 22. The transition from bone cortex to marrow is comparable to the bone boundary; hence a separate adaptation of each vertebra is likely to fail as illustrated in the third image 23. Using the feature identification of the invention successfully preserves the spatial relationship of the vertebral meshes and hence results in a reasonable segmentation as illustrated in the fourth image 24.

A person skilled in the art will appreciate that the system of the invention may be applied to detect mesh self-collision, when a candidate feature is located inside the mesh under adaptation. In this case, the region must include a part of the area defined by the mesh to be adapted. This option may be especially useful for segmenting long flexible structures such as blood vessels, for example.

A person skilled in the art will recognize that the "energy" analogy is widely used in the art to describe model-based image segmentation. However, other terms, e.g. objective function, may be used instead of the energy function. Similarly, minimizing the energy is an example of optimizing an objective function. Optimizing may be defined as finding a maximum of the objective function. Additionally, those skilled in the art will recognize that minimizing energy may be carried out by means of minimizing a force field without referring to the energy. Such a force field comprises forces acting on vertices of meshes adapted to the objects in the image data and may be minimized using simulated annealing, for example. Hence, the scope of the claims should not be construed as being limited by the particular choice of words and algorithms used in the claims and description.

A person skilled in the art will appreciate that the system 100 may be a valuable tool for assisting a physician in many aspects of her/his job. Further, although the embodiments of the system are illustrated using medical applications of the system, non-medical applications of the system are also contemplated.

Those skilled in the art will further understand that other embodiments of the system 100 are also possible. It is possible, among other things, to redefine the units of the system and to redistribute their functions. Although the described embodiments apply to medical images, other applications of the system, not related to medical applications, are also possible.

The units of the system 100 may be implemented using a processor. Normally, their functions are performed under the control of a software program product. During execution, the software program product is normally loaded into a memory, like a RAM, and executed from there. The program may be loaded from a background memory, such as a ROM, hard disk, or magnetic and/or optical storage, or may be loaded via a network like the Internet. Optionally, an application-specific integrated circuit may provide the described functionality.

Figure 3:
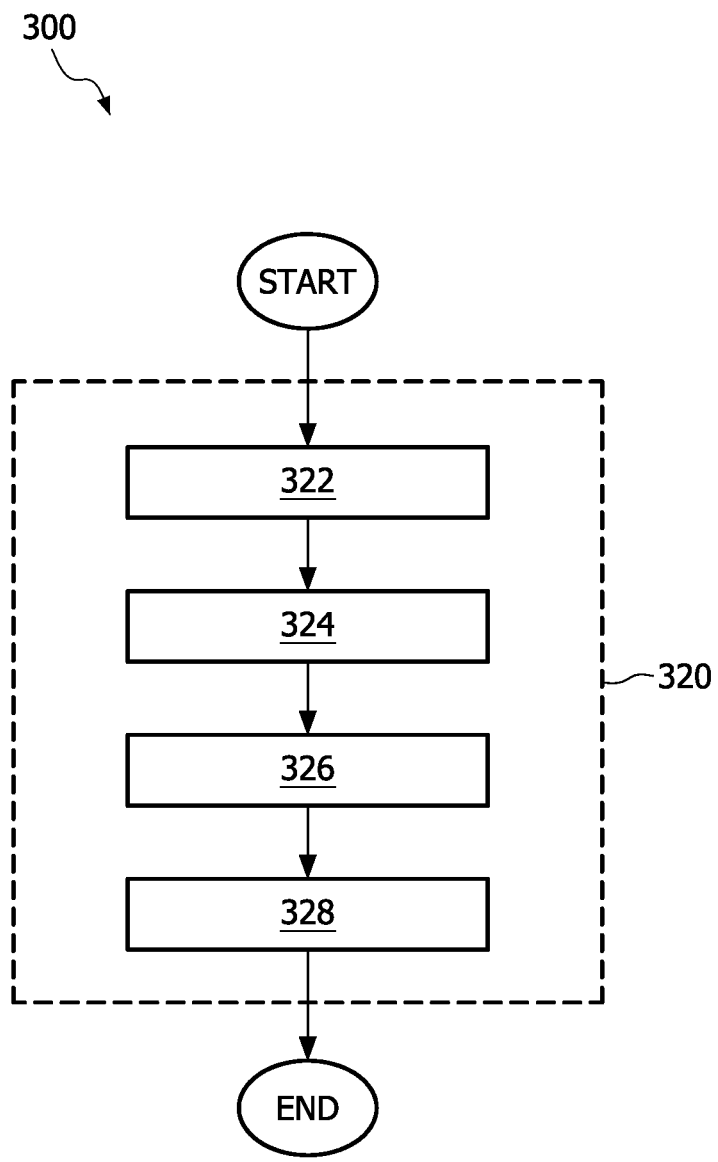
FIG. 3 shows a flowchart of an exemplary implementation of the method.

FIG. 3 shows a flowchart of an exemplary implementation of the method 300 of segmenting an object in image data using model-based image segmentation. The flowchart shows identifying one feature, e.g., for one face of a triangular mesh. The method 300 begins with candidate feature step 322 for selecting a plurality of candidate features in the image data, for identifying a feature to be included in the features identified in the image data. After the candidate feature step 322, the method 300 continues to a position step 324 for determining a position of each candidate feature of the plurality of the candidate features relative to a region of the image data. After the position step 324, the method 300 continues to a feature function step 326 for computing the strength of each candidate feature, wherein the strength of each candidate feature depends on the position of each candidate feature relative to the region. After the feature function step 326, the method 300 continues to an evaluation step 328 for evaluating each candidate feature of the plurality of candidate features and for identifying the feature among the plurality of candidate features based on this evaluation. After the evaluation step 328, the method 300 terminates.

A person skilled in the art may change the order of some steps or perform some steps concurrently using threading models, multi-processor systems or multiple processes without departing from the concept as intended by the present invention. Optionally, two or more steps of the method of the current invention may be combined into one step. Optionally, a step of the method of the current invention may be split into a plurality of steps. Advantageously, the described feature step may be iteratively used for identifying a plurality of features in the image data and may be a step of a complete segmentation method.

Figure 4:
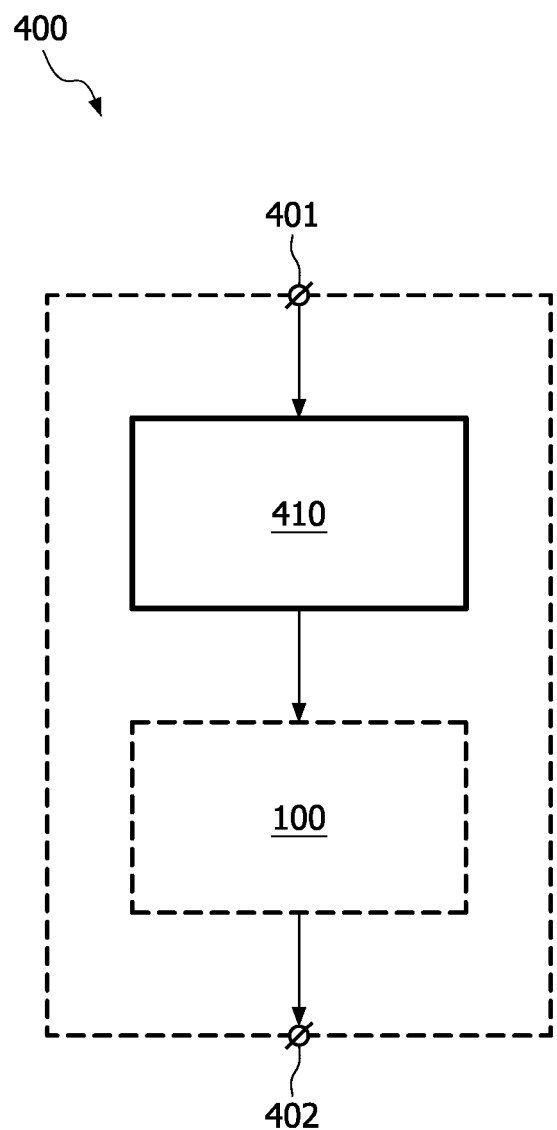
FIG. 4 schematically shows an exemplary embodiment of the image acquisition apparatus.

FIG. 4 schematically shows an exemplary embodiment of the image acquisition apparatus 400 employing the system 100 of the invention, said image acquisition apparatus 400 comprising an image acquisition unit 410 connected via an internal connection with the system 100, an input connector 401, and an output connector 402. This arrangement advantageously increases the capabilities of the image acquisition apparatus 400, providing said image acquisition apparatus 400 with advantageous capabilities of the system 100.

Figure 5:
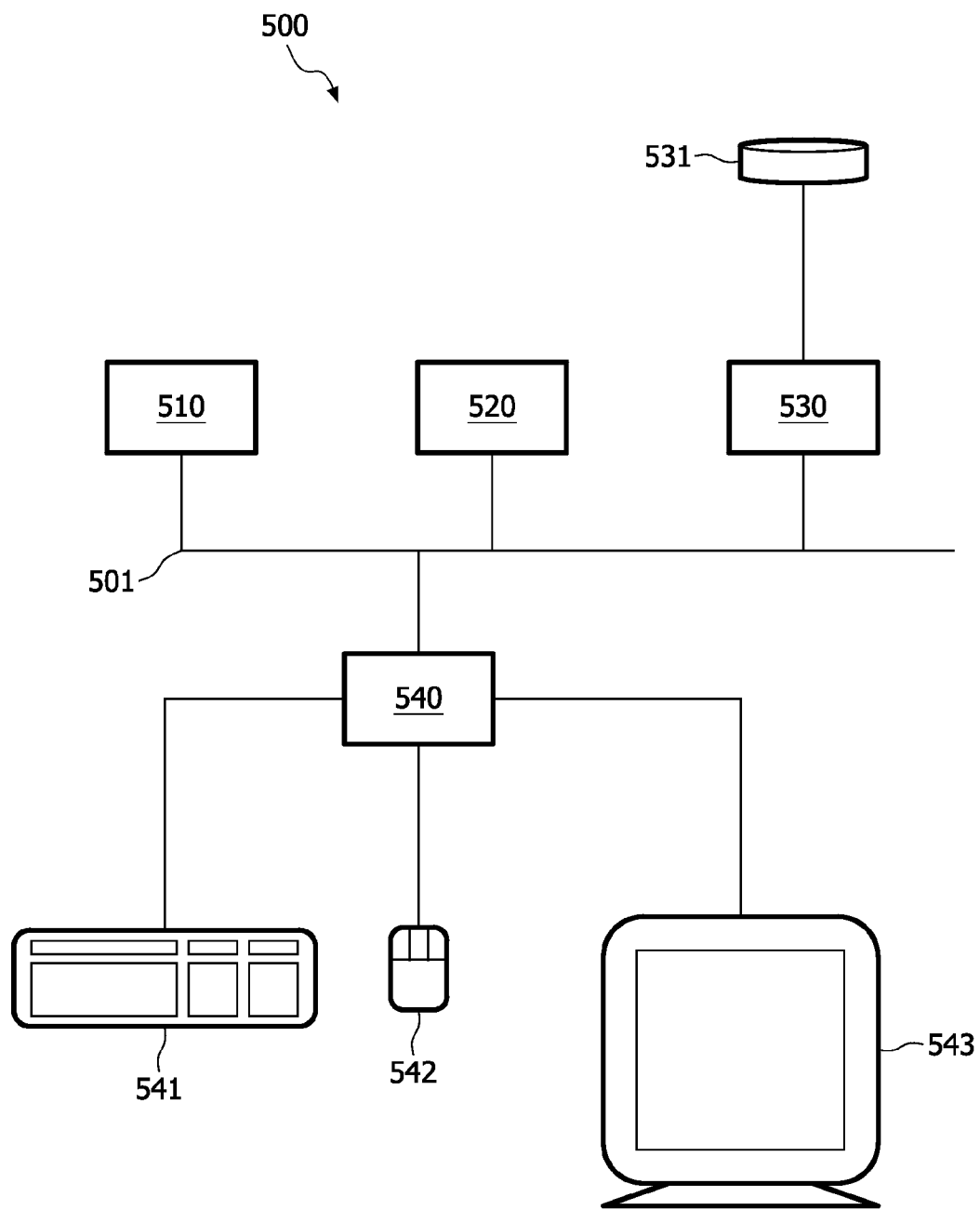
FIG. 5 schematically shows an exemplary embodiment of the workstation.

FIG. 5 schematically shows an exemplary embodiment of the workstation 500. The workstation comprises a system bus 501. A processor 510, a memory 520, a disk input/output (I/O) adapter 530, and a user interface (UI) 540 are operatively connected to the system bus 501. A disk storage device 531 is operatively coupled to the disk I/O adapter 530. A keyboard 541, a mouse 542, and a display 543 are operatively coupled to the UI 540. The system 100 of the invention, implemented as a computer program, is stored in the disk storage device 531. The workstation 500 is arranged to load the program and input data into memory 520 and execute the program on the processor 510. The user can input information to the workstation 500, using the keyboard 541 and/or the mouse 542. The workstation is arranged to output information to the display device 543 and/or to the disk 531. A person skilled in the art will understand that there are numerous other embodiments of the workstation 500 known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the system claims enumerating several units, several of these units can be embodied by one and the same item of hardware or software. The usage of the words first, second, third, etc., does not indicate any ordering. These words are to be interpreted as names.

The invention claimed is:

1. A system for segmenting an object in image data using model-based image segmentation, the system comprising a feature unit for identifying features in the image data for computing an external energy of a mesh on the basis of a current position of the mesh, wherein the feature unit further comprises:
   a candidate feature unit for selecting a plurality of candidate features in the image data, for identifying a feature to be included in the features identified in the image data;
   a position unit for determining a position of each candidate feature of the plurality of the candidate features relative to a region of the image data, wherein each of the candidate features is within the region;
   a feature value unit for computing a feature value of each of the candidate features;
   a feature function unit for computing a strength of each of the candidate features, wherein the strength of each of the candidate features depends on the feature value of the corresponding candidate feature and the ratio of the strength and the feature value of each of the candidate features depends on the position of the corresponding candidate feature relative to the region; and
   an evaluation unit for evaluating each of the candidate features of the plurality of candidate features and for identifying the feature to be included from among the plurality of candidate features based on this evaluation.

2. The system as claimed in claim 1, further comprising:
   a pre-positioning unit for pre-positioning the mesh for segmenting the object, thereby initializing the mesh current position;
   a transformation unit for computing a transformation which best aligns the mesh in the mesh current position with the pre-positioned mesh;
   an adaptation unit for updating the mesh current position by updating current positions of vertices of the mesh to minimize a weighted sum of at least the external energy and the internal energy of the mesh; and
   a control unit for evaluating a convergence condition dependent at least on the minimized weighted sum or on the updated current position of the mesh, and further for terminating segmenting the object if the condition is satisfied and for continuing segmenting the object if the condition is not satisfied.

3. The system as claimed in claim 1, wherein the strength of each of the candidate features inside the region is a function of the distance from the corresponding candidate feature inside the region to a boundary of the region.

4. The system as claimed in claim 3, wherein the region boundary is defined by a mesh adapted to a second object in the image data.

5. The system as claimed in claim 1, wherein a plurality of objects in image data are segmented by adapting a mesh to each object of the plurality of objects, wherein, during adaptation of a certain mesh to a certain object of the plurality of objects, the region is defined based on current positions of meshes adapted to objects of the plurality of objects other than the certain mesh.

6. A system for segmenting an object in image data using model-based image segmentation, the system comprising a feature unit for identifying features in the image data for computing an external energy of a mesh on the basis of a current position of the mesh, wherein the feature unit further comprises:
 a candidate feature unit for selecting a plurality of candidate features in the image data, for identifying a feature to be included in the features identified in the image data;
 a position unit for determining a position of each candidate feature of the plurality of the candidate features relative to a region of the image data;
 a feature value unit for computing a feature value of each of the candidate features;
 a feature function unit for computing a strength of each of the candidate features, wherein the strength of each of the candidate features depends on the feature value of the corresponding candidate feature and the position of the corresponding candidate feature relative to the region, wherein the strength of each of the candidate features inside the region is a function of the distance from the corresponding candidate feature inside the region to a boundary of the region, wherein the strength of each of the candidate features inside the region substantially decreases with the distance from the corresponding candidate feature inside the region to the boundary of the region; and
 an evaluation unit for evaluating each of the candidate features of the plurality of candidate features and for identifying the feature to be included from among the plurality of candidate features based on this evaluation.

7. A method of segmenting an object in image data using model-based image segmentation, the method comprising a feature step for identifying features in the image data for computing an external energy of a mesh on the basis of a current position of the mesh, wherein the feature step further comprises:
 a candidate feature step for selecting a plurality of candidate features in the image data, for identifying a feature to be included in the features identified in the image data;
 a position step for determining a position of each candidate feature of the plurality of the candidate features relative to a region of the image data, wherein each of the candidate features is within the region;
 a feature value step for computing a feature value of each of the candidate features;
 a feature function step for computing a strength of each of the candidate features, wherein the strength of each of the candidate features depends on the feature value of the corresponding candidate feature and the ratio of the strength and the feature value of each of the candidate features depends on the position of the corresponding candidate feature relative to the region; and
 an evaluation step for evaluating each of the candidate features of the plurality of candidate features and for identifying the feature to be included from among the plurality of candidate features based on this evaluation.

8. A computer program product embodied on a non-transitory computer readable medium to be loaded by a computer arrangement, comprising instructions for segmenting an object in image data using model-based image segmentation, said instructions further comprising instructions for identifying features in the image data for computing an external energy of a mesh on the basis of a current position of the mesh, the computer arrangement comprising a processing unit and a memory, the computer program product, after being loaded, providing said processing unit with the capability to carry out steps of the method as claimed in claim 7.

9. A system, comprising:
 a non-transitory computer readable storage medium that stores a set of instructions; and
 a processor configured to execute the set of instructions, wherein the set of instructions, when executed, cause the processor to:
  identify features in image data for computing an external energy of a mesh on the basis of a current position of the mesh,
  select a plurality of candidate features in the image data, for identifying a feature to be included in the features identified in the image data,
  determine a position of each candidate feature of the plurality of the candidate features relative to a region of the image data, wherein each of the candidate features is within the region,
  compute a feature value of each of the candidate features,
  compute a strength of each of the candidate features, wherein the strength of each of the candidate features depends on the feature value of the corresponding candidate feature and the ratio of the strength and the feature value of each of the candidate features depends on the position of the corresponding candidate feature relative to the region, and
  evaluate each of the candidate features of the plurality of candidate features and for identifying the feature to be included from among the plurality of candidate features based on this evaluation.

* * * * *